United States Patent [19]

Maroteaux et al.

[11] Patent Number: 5,544,303
[45] Date of Patent: Aug. 6, 1996

[54] METHOD FOR CONFIGURING AND OPERATING A TELECOMMUNICATION APPARATUS

[75] Inventors: Jacques Maroteaux, Antibes; Bernard Richard, Contes, both of France

[73] Assignee: International Business Machines Corporation, Armonk, N.Y.

[21] Appl. No.: 152,570

[22] Filed: Nov. 12, 1993

[30] Foreign Application Priority Data

Dec. 17, 1992 [EP] European Pat. Off. .............. 92480196

[51] Int. Cl.⁶ ..................................................... G06F 15/62
[52] U.S. Cl. ............................................................. 395/161
[58] Field of Search ..................................... 395/161, 159

[56] References Cited

FOREIGN PATENT DOCUMENTS 0474578  7/1991  European Pat. Off. .
9211724  7/1992  WIPO .

OTHER PUBLICATIONS

Research Disclosure No. 292, Aug. 1988, New York, US, p. 612 "Automated 'WYSIWYG' Presentation of Hardware" (whole article).

SDL '87: State Of the Art and Future Trends 1987, Amsterdam, NL pp. 117–125.
Hong et al, "SDL–Oriented Graphical Environment" pp. 118–120: Section 2 & 3.

*Primary Examiner*—Mark R. Powell
*Attorney, Agent, or Firm*—John J. Timar; John B. Frisone

[57] ABSTRACT

A method for configuring and operating a telecommunication apparatus having a user interface module handling communication with an operator, a teleprocessing module handling telecommunication procedures during operation and an editor. A first set of graphic objects related to parameters representative of telecommunication protocols, networks and hardware components used in the apparatus are displayed in a first window. These parameters are stored in a first file which can be updated by both the user interface module and the telecommunication module and can be read by the telecommunication module. A second set of graphic objects related to parameters representative of problem determination procedures are displayed in a second window. These are stored in a second file which can be updated by the user and telecommunications modules and read by the user module. A third set of graphic objects related to the state of the apparatus are displayed in a third window. These are stored in a third file which can be read by the user interface module but can only be updated by the telecommunication module.

8 Claims, 14 Drawing Sheets

FIG. 4a

```
ISDN Subscriber Directory
File  View  Keys  Help

Time Stamp :  1991/09/30 19:00 44
       ISDN Number :  93210141
          ISDN CPS :  93706739
       X25 Address :  93210142
    Coding Standard :  CCITT
  High Layer Charac. :  Telephony G-711
         Comment 1 :  Comment 1 :
         Comment 2 :  Comment 2 :
      Terminal Type :  x25
   Upstream Routing :  x25 Address
            Profile :  x25 1
```

FIG. 4b

```
Gateway general parameters
File  View  Keys  Help

Local ISDN Number :  9876532100
            Country :  FRANCE
            Security :  ON
        Network Type :  VN2
```

FIG. 4i

```
================ Statistic Log Display ================
File  View  Keys  Help RID :   S
       Time :   91/10/21 11:40:09
    Error ID :   227
 Error Message : D channel statistics
      Cor ID :   00000
   Error Level : 005
     Comp ID :   00

LOCAL_ISDN_NBRE          12345678
            ADAPTER_NBRE             00
            Remote alarm indicator   41 00 00 00 41
            Loss of received signal  42 00 00 00 42
            Loss of frame alignment  43 00 00 00 43
            Local alarm indicator    44 00 00 00 44
```

FIG. 5

| Time Stamp | ISDN Number | ISDN CPS |
|---|---|---|
| 1991/09/30 19:00:36 | 9344 | 9370 |
| 1991/10/10 11:08:09 | 93241640 | 1000 |
| 1991/10/17 10:41:30 | 93241015 | 6000 |
| 1991/09/30 19:00:44 | 93210141 | 993706739 |
| 1991/10/17 17/31/45 | 93110002 | 20 |
| 1991/10/17 17:31:40 | 93110001 | 10 |
| 1991/10/17 17:31:36 | 93110000 | 00 |
| 1991/10/01 11:37:03 | 92114600 | 05742 |
| 1991/10/09 17:27:57 | 92111000 | 20 |
| 1991/10/09 17:27:52 | 92111000 | 10 |
| 1991/10/09 17:27:48 | 92110010 | 00 |

(ISDN Subscriber Directory — File View Keys Help)

FIG. 6

| | FILE | | | | OPERATION | | | | | | PB | | VIEW | | HELP |
|---|---|---|---|---|---|---|---|---|---|---|---|---|---|---|---|
| | NEW | OPEN | DELETE | EXIT | BACKUP | COMPILE | RELOAD | START | STOP | PASSWORD | TRACE | DUMP | DISPLAY | STATUS | HELP |
| LAP.B(311) | X | X | X | X | | X | | | | X | | | X | | X |
| PLP(312) | X | X | X | X | | X | | | | X | | | X | | X |
| X25(313) | X | X | X | X | | X | | | | X | | | X | | X |
| SDLC(314) | X | X | X | X | | X | | | | X | | | X | | X |
| GATEWAY(315) | | X | | X | | X | X | X | X | X | | | X | | X |
| ISDN CARDS | X | X | X | X | | X | | | | X | | | X | | X |
| X25 CARDS & LINE | X | X | X | X | | X | | | | X | | | X | | X |
| SUBSCRIBER(322) | X | X | X | X | | X | | | | X | | | X | | X |
| BACKUP(323) | | | | X | X | X | | | | X | | | X | | X |
| COMPILE ERROR (324) | | X | | X | | X | | | | X | | | X | | X |
| ERROR LOG(331) | | X | X | X | | X | | | | X | | | X | | X |
| STATISTICS LOG (332) | | X | X | X | | X | | | | X | | | X | | X |
| PS/2 INT.(333) | | | | X | | X | | | | X | X | | X | | X |
| ISDN CIB(334) | | | | X | | X | | | | X | | X | X | | X |
| (335)ISDN TEL | | | | X | | X | | | | X | X | | X | | X |
| X25 LINE(336) | | | | X | | X | | | | X | X | | X | | X |

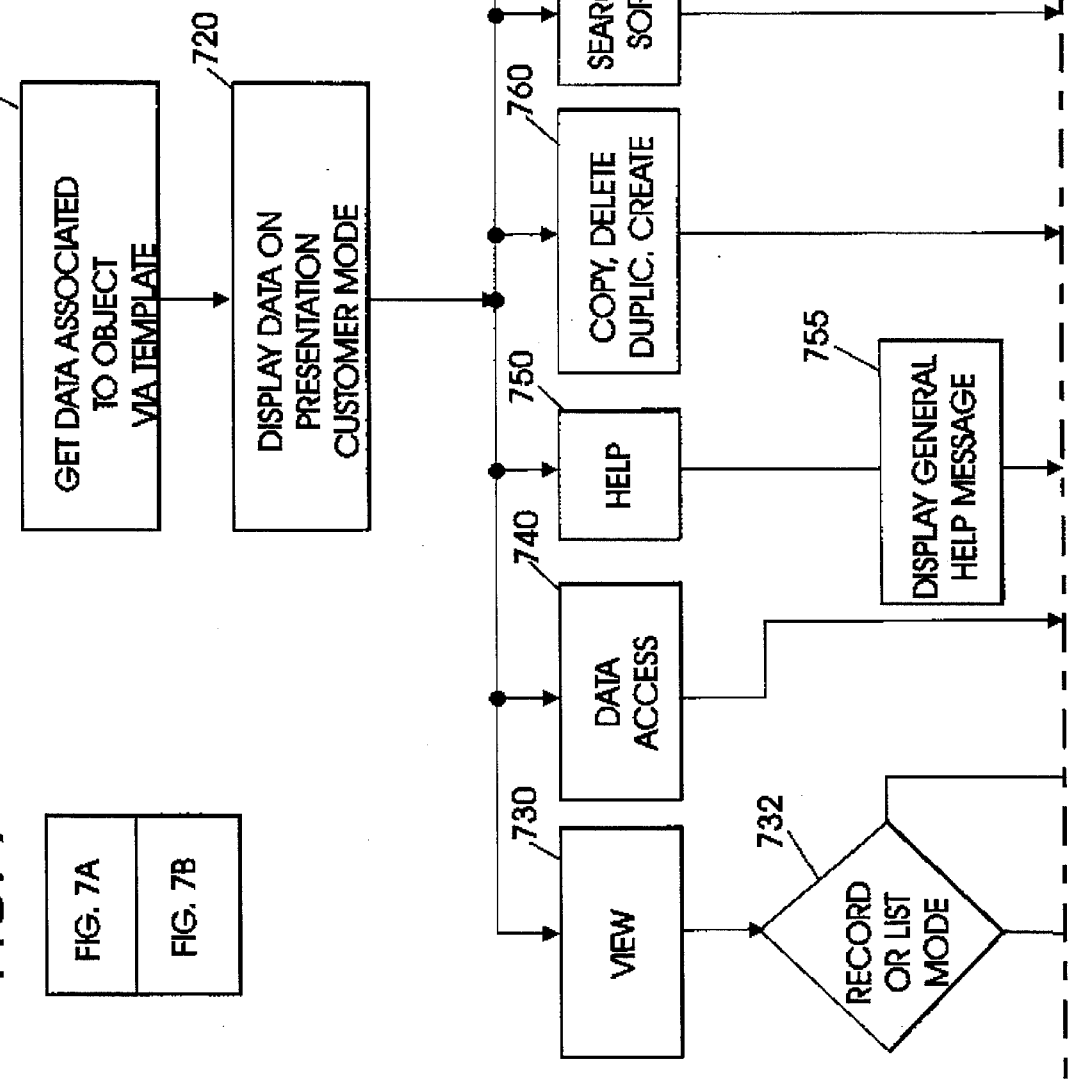

METHOD FOR CONFIGURING AND OPERATING A TELECOMMUNICATION APPARATUS

TECHNICAL FIELD OF THE INVENTION

The invention relates generally to the telecommunication field and particularly to a method for configuring and operating a telecommunication apparatus including a user interface module for handling the communication with an operator, and a teleprocessing module for handling the telecommunication procedures which are involved during the teleprocessing operations.

BACKGROUND ART

Integrated Services Digital Network (I.S.D.N) is an international communications standard that makes it possible to deliver multiple services in addition to the normal telephone (voice) service. Thus, fax, video, data, and all kinds of images can be transmitted to a terminal over a single line. The ISDN service is provided by public network operators at both national and international levels. They offer a choice of Basic or Primary Rate access to the ISDN network. The Basic access (also called 2B+D) provides two 64 Kbps channels for voice or data communications plus one D channel for controlling and monitoring of the transmission, giving an aggregate speed of 144 Kbps. The Primary rate (which is called 30B+D) offers up to 30 simultaneous 64 Kbps B channels and one 64 Kbps D channel for an aggregate speed of 2 Mbps.

The performance offered by ISDN networks, and particularly the throuput provided by the primary rate, has allowed the possibility of effective national and international communications between host computers, either IBM or non IBM, running X25, SNA, TCP/IP or OSI applications, and a wide range of terminal equipment and users. Thus, a wide range of users, who are generally not specialized in the telecommunication field or in the structure and operating of sophisticated telecommunication equipments, benefit from the high rates and possibilities of the ISDN equipment.

For instance, the possibilities offered by ISDN networks have allowed the creation and development of electronic catalogs and multimedia databases. Electronic images which are stored on a central database can thus be accessed in a few seconds by multiple users within a country or across borders. Electronic and up-to-date catalogs allow travel agents, for example, to show specific resorts and hotels with much more detail than by using a printed catalog. Tour operators can also benefit from these possibilities since the update of one single, central data base appears easier and cheaper. Also distributers and retailers can demonstrate products clearly, whether the items are cars, fashion or technical products, and they can let users browse through catalogs and place orders directly. Retailers can show a wide variety of models electronically without having to keep the whole expensive range on hand, and additions and deletions are easily handled. The ISDN network allows a set of up to 30 users to simultaneously be connected to one electronic catalog.

Further, the possibilities which are offered by the ISDN networks also allow the development of file transfers where software can be downloaded or retrieved from a central host by remote branch office or distribution centers to take advantage of lower tarifs during non-peak hours.

As a conclusion, a wide number of different telecommunication users are allowed to benefit from the possibilities which are offered by the ISDN telecommunication primary rate communications, including data, voice, and image transfers by means of a corresponding wide number of telecommunication applications.

This wide number of telecommunications applications is likely to include travel agency, real estate, retailing and distribution applications.

These require that sophisticated telecommunication equipment or gateways providing access to the ISDN primary interface be sufficiently simple in terms of customization, configuration, line connections, directory management and data traffic control so as to be operable by a user who does not have the knowledge of a fully qualified telecommunication engineer.

The problem to be solved by the present invention allows a simple operator, who is not particularly qualified in the telecommunication field or particularly in the ISDN network and the multiple connections between ISDN terminals and X25, SNA, TCP/IP or OSI applications running in host computers, to easily configure, operate and control a sophisticated gateway equipment, thereby allowing access to a ISDN primary rate.

SUMMARY OF THE INVENTION

This problem is solved by the method for configuring and operating a telecommunication apparatus according to the invention which involves the step of displaying of a Graphic Object Selection (GOS) display. The display comprises a set of graphic objects associated with files comprising parameters required for the teleprocessing functions performed by the apparatus and particularly defining the parameters of the different layers in the OSI model. With the method of the invention, the different graphic objects are organized in such a manner that the storage or memory which is needed for carrying out the multiple teleprocessing communications through the ISDN network, particularly with multiple DTEs having different protocols, can be decreased. In addition to this, the configuration and the day-to-day operating functions are made much easier for use by a non-experienced operator.

More particularly, the method according to the present invention comprises the steps of:

displaying in a first window a first set of objects being associated with a first set of parameters which are representative of the different telecommunication protocols, the telecommunication network and the hardware components thereof, said parameters being loaded in a first file read by a teleprocessing module and which can be updated either by a user interface module or said teleprocessing module, displaying in a second window a second set of graphic objects being representative of data and parameters relating to the problem determination procedures in said network apparatus, said objects being associated with a second file which can be read by said user interface module and can be updated either by said teleprocessing module or said user interface module, and displaying in a third window a third set of graphic objects representative of the state of said apparatus and associated with a third file which can be read by said user interface module and which can only be updated by said teleprocessing module active in the machine.

This results in increased independence between the functional code which runs into the machine and also facilitates the configuration and the operation of the apparatus. That further renders easier the future correction and adaptation of the apparatus and more generally, maintenance operations.

Preferably, the color of each object is coded, thereby allowing the user to instantaneously catch the status of the gateway equipment in a glance.

In a preferred embodiment of the invention, the method according to the present invention comprises two distinctive editing routines, a first routine being associated with steps and procedures allowing the editing and the updating of one object by a non qualified operator, and a second routine which is associated with steps and editing procedure allowing a quick editing and updating of the corresponding object by an operator having more skill in the use of the system. In this way, control and management of the ISDN primary gateway equipment is allowed for a wide range of different users operating the gateway.

Preferably, the first window includes a panel comprising a subset of graphic objects representative of the LAPB, PLP, X.25 and SDLC protocols parameters of the terminals which can communicate with said apparatus, whereby the OSI layers 2 and 3 are easily editable and handled by the operator.

In a preferred embodiment of the invention, the first window further comprises a graphic object representative of the parameters of the hardware components of the machine, including the serial number of the machine, the country where it is located, and the control mode of its security access.

Additionaly, the first window displays a graphic object which comprises the list and characterizing parameters of the Data Terminating Equipment (DTE) which are authorized access to the apparatus. Preferably, the object comprising the parameters of the list of said authorized terminals comprises a logical link to some of said graphic objects representative of the X.25 and SDLC protocols, whereby said apparatus is capable of handling the communication with a numerous set of different terminals.

In a preferred embodiment of the invention, the method allows the configuration and the operation of an ISDN primary gateway, allowing the connection of DTE to X.25 host computers.

BRIEF DESCRIPTION OF THE DRAWINGS

FIG. 4a illustrates an editing function, in the CURRENT RECORD mode, and also in PRIMER MODE, of the different parameters which are associated with the SUBSCRIBER DIRECTORY object 322.

FIG. 4b is an illustrative view of the result of editing the GATEWAY object 315 which contains the physical parameters of a Personal System/2 workstation which embodies the telecommunication equipment using the invention. A double click mouse-selection operation on the GATEWAY object 315 results in a call of a routine causing the first mode of editing to be used.

FIGS. 4h and 4i respectively illustrate the editing of the ERROR_LOG file in the CURRENT RECORD mode.

FIGS. 5 illustrates editing in the LIST mode, and also in ADVANCED mode, of the different parameters which are associated with the SUBSCRIBER DIRECTORY, object 322.

FIG. 6 shows the correspondence table between the different graphic objects being used in the Graphic Object Selector and the different actions which are authorized in those data.

DESCRIPTION OF THE PREFERRED
EMBODIMENT OF THE INVENTION

Figure 1:
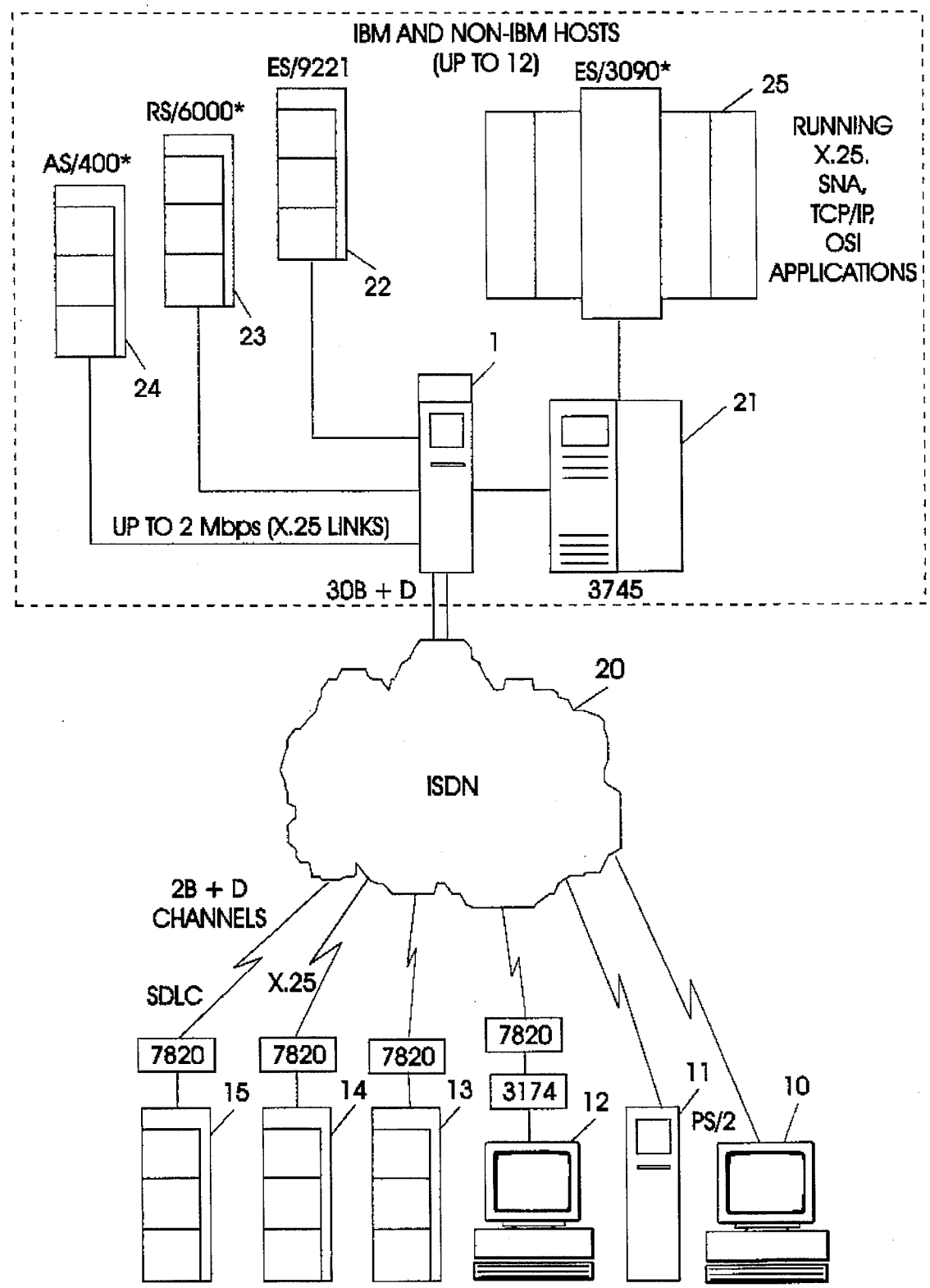
FIG. 1 illustrates the technical environment of an ISDN primary gateway which can incorporate the method according to the present invention.

With respect to FIG. 1, there is shown the general technical environment of one ISDN primary gateway equipment 1 which can advantageously incorporate the different technical steps of the method according to the present invention. ISDN primary rate gateway equipment 1 allows different Data Terminating Equipment (DTE), such as a terminal 10, interactive terminal 11, a terminal 12 to be connected to a cluster controller of the type IBM 3174 via an ISDN terminal adapter of the type IBM 7820, and also permits connection of data processing system 13, 14 and 15 of the type IBM RISC System/6000 which are connected to the ISDN network through their associated IBM 7820 terminal adapters, for instance. In one embodiment of the invention, each DTE 10 to 15 may be located in different towns. For instance, DTE 15 can be located in Paris while DTE 14 operates in London and DTE 13 in Munich, and each is provided a 2B+D basic access to their national respective ISDN networks in order to get access to an electronic database placed in a host computer 25 of the type IBM 3090, also located in Paris, via a telecommunication controller equipment 21, such as a IBM 3745. Such a telecommunication architecture could be particularly useful in the real estate field where up to 30 different remote DTEs, each one being located in a corresponding real estate agency, can get the access to a centralized database of the houses for sales in Europe. The database can contain a wide and comprehensive description, including data, images and possibly music or voice, within Host computer 25 in Paris. It should be noticed that the architecture is not limited to one single host computer 25. The ISDN primary gateway i could also provide the access to additional host computers, such as a IBM ES/9221 host 22, a RISC System/6000 host 23 and an AS/400 computer 24.

The reference numerals used in FIGS. 2, 3 and 7–10 indicate the figure in which they appear. For example, elements introduced for the first time and illustrated in FIG.

2 have reference numerals in the 2XX range. Similarly FIGS. 3 and 7–10 have reference numerals in the 3XX, 7XX, 8XX, 9XX and 10XX ranges, respectively. In view of this numbering scheme it is not necessary to clutter up the specification with superfluous references to figure numbers since the reference numeral itself includes the figure designation in the digits above the tens order.

Figure 2:
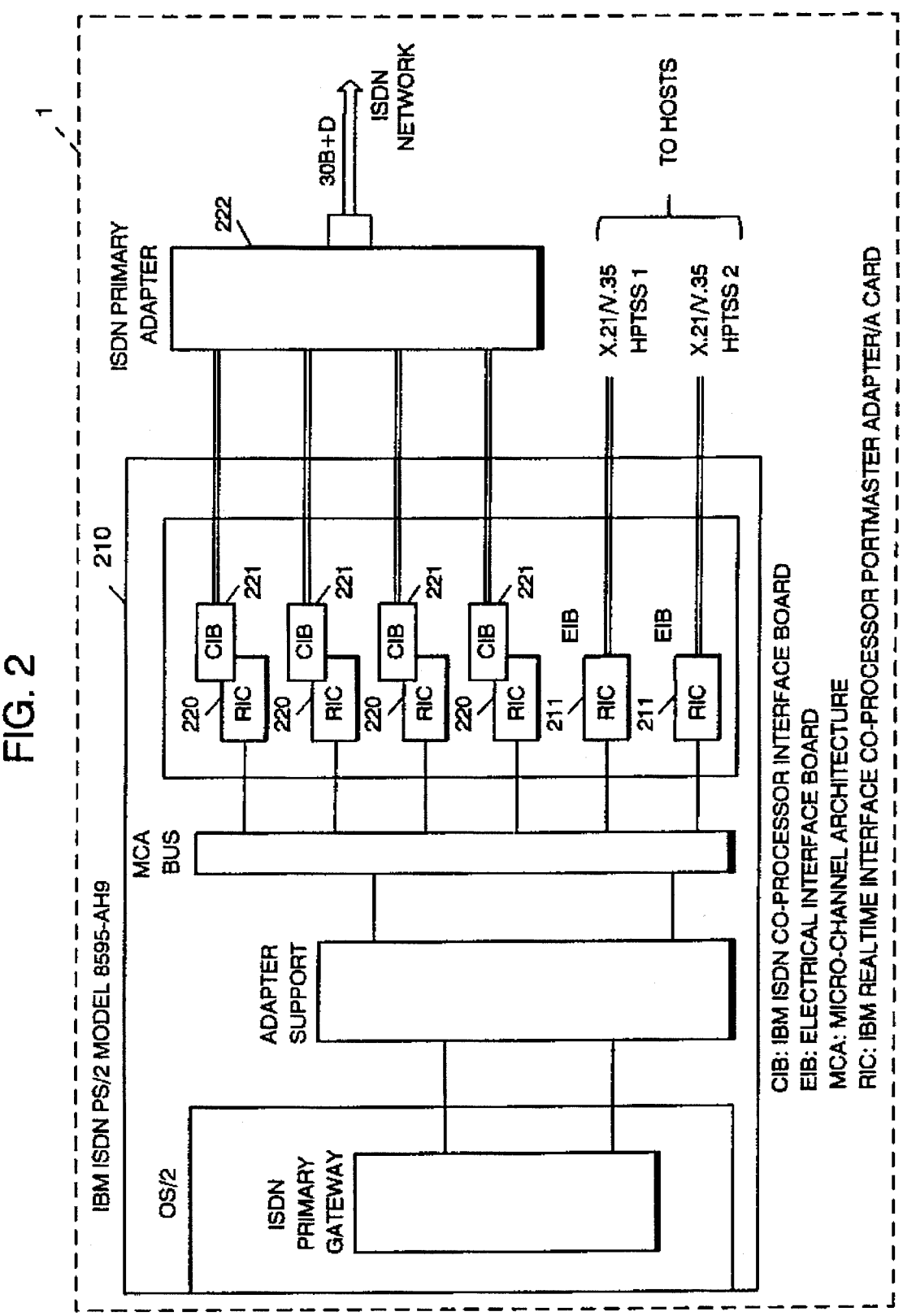
FIG. 2 illustrates the basic physical structure of an ISDN primary gateway which can incorporate the method according to the present invention.

With respect to the FIG. 2, there is described the general architecture of the ISDN primary gateway which uses the method according to the present invention. Gateway 1 comprises a computer 210, which is of the type such as the IBM Personal System/2 8595-AH9 in the preferred embodiment of the invention, into which is plugged one or two X25 cards 211 for allowing the X.21/V.35 connections to the host computers. Additionally, it comprises one to four ISDN cards 220 which allow the connection of the computer to a ISDN primary adapter 222. Each X25 card 211 or ISDN card 220 is currently available under the reference "IBM Real Time Interface Coprocessor Portmaster Adapter/A" card (RIC) which is marketed by IBM and is well known to those skilled in the art.

Briefly, each RIC Portmaster card 211 or 220 comprises its own microprocessor operating with some memory and a Direct Memory Access (DMA) controller, I/O devices etc. That microprocessor is associated with an operating system providing time sharing and priority management. Each RIC Portmaster card is directly connected to the Micro-channel Architecture (MCA) bus of the computer 210, whose resources are therefore available to all the cards which are plugged into the machine.

It should be noticed that in the preferred embodiment of the invention, each X.25 card is a RIC Portmaster card or MOTHER board, on which is plugged a (not shown in FIG. 2) additional corresponding DAUGHTER card of the type ELECTRICAL INTERFACE BOARD providing the electrical interface, either conforming with the X21 or V35 CCITT Recommendations, that is to say, to the well known functions corresponding to the layer 1 of the OSI model.

Assuming that one Host computer to which the ISDN primary gateway 1 is intended to be connected has a V35 interface, the corresponding RIC Portmaster card 211 will be fitted with a V35 DAUGHTER board card. In the reverse case, i.e. the case of a Host computer communicating through a X21 interface, the RIC Portmaster card will be fitted with a DAUGHTER card matching the CCITT X21 Recommendations. Similarly, each ISDN RIC Portmaster card 220 is fitted with a corresponding ISDN DAUGHTER card 221 which allows the electrical connection to a ISDN primary adapter 222 achieving the Time Division Multiplexing (TDM) of the 30 B channels, whereby the ISDN primary gateway provides the primary access to the ISDN network.

The internal structure of the different RIC Portmaster cards 220 and 221, with their associated DAUGHTER card, and also with the structure of the multiplexing adapter 222 are not part of the present invention and they will not be described further. Details of such elements can be shown in the U.S. patent application entitled "Method and Apparatus for Initializing ISDN Adapter Cards in a Workstation Operating as an ISDN Primary Gateway" filed simultaneously herwwith by the same assignee, the description of which is not necessary, but is incorporated by reference in this application.

Figure 3:
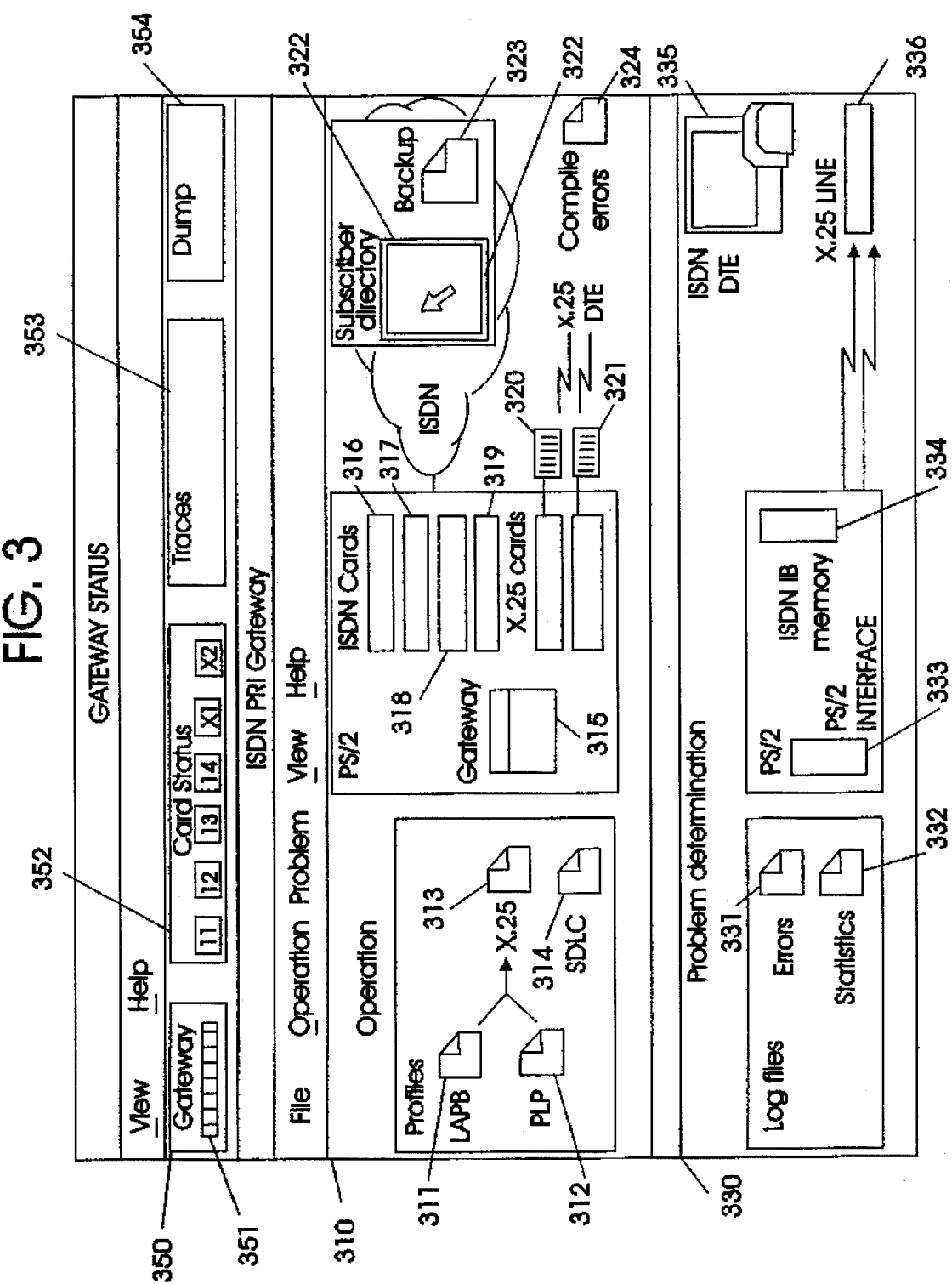
FIG. 3 illustrates the Graphic Object Selector (GOS) which is used in the method according to the present invention.
Figure 4C:
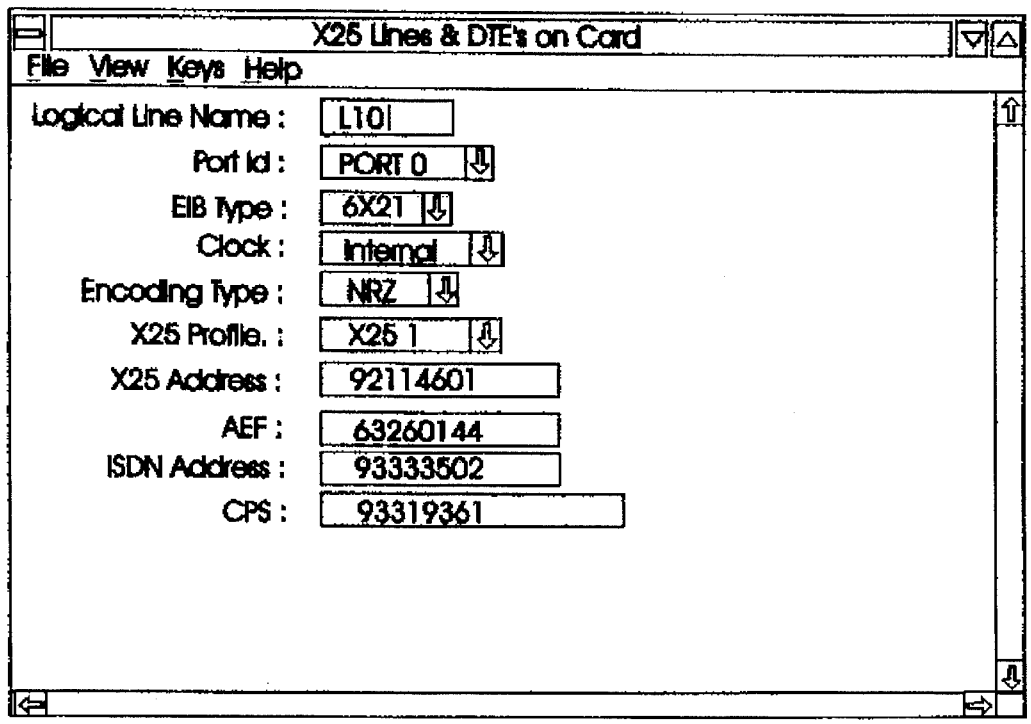
FIG. 4c illustrates the result of the CURRENT RECORD mode editing action of the X.25 CARDS, object 320, containing data characterizing the X.25 line.
Figure 4D:
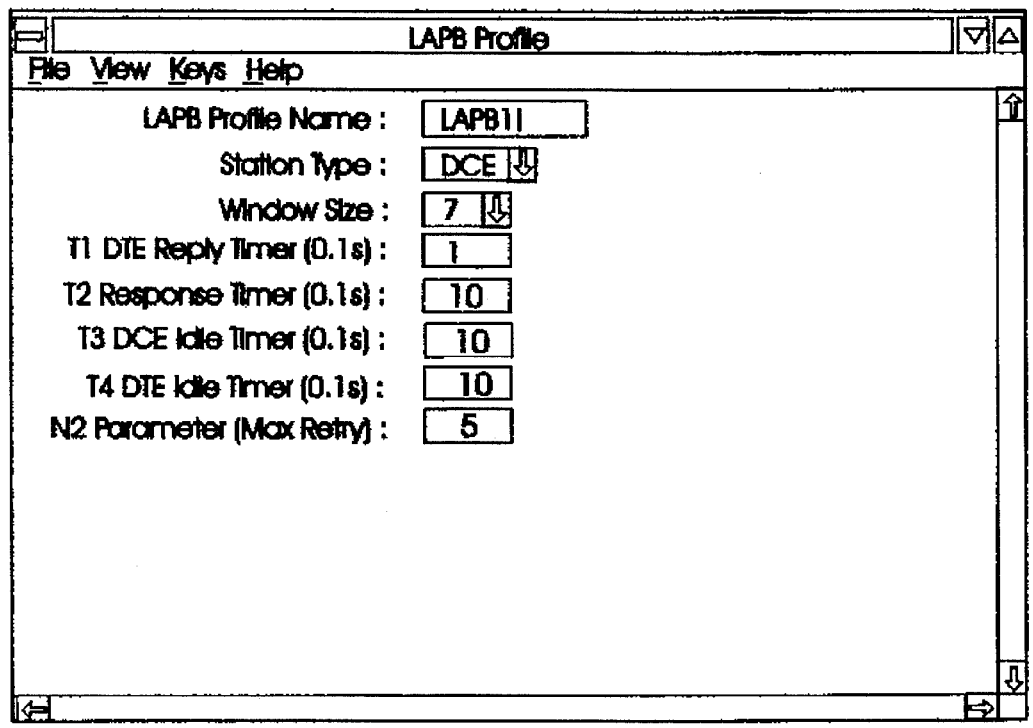
FIGS. 4d, 4e, 4f and 4g respectively show the editing of the LAPB PROFILE object 311, the PLP PROFILE object 312, the X.25 PROFILE object 313 and the SDLC PROFILE object 314 in the simple CURRENT RECORD mode.
Figure 4E:
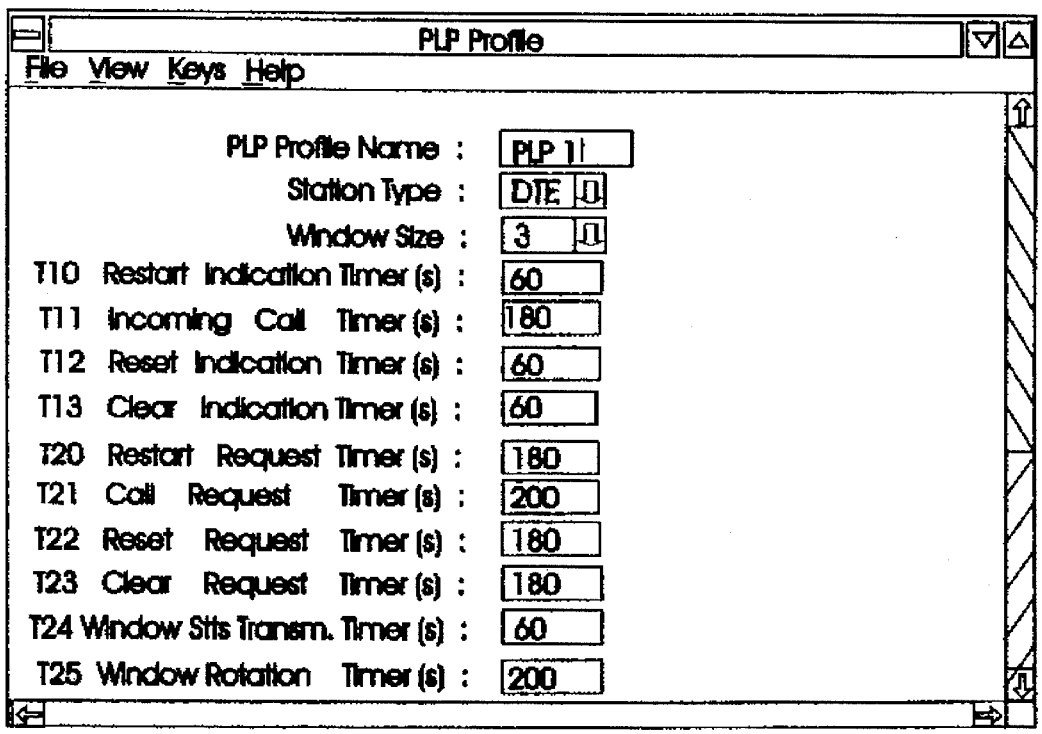
Figure 4F:
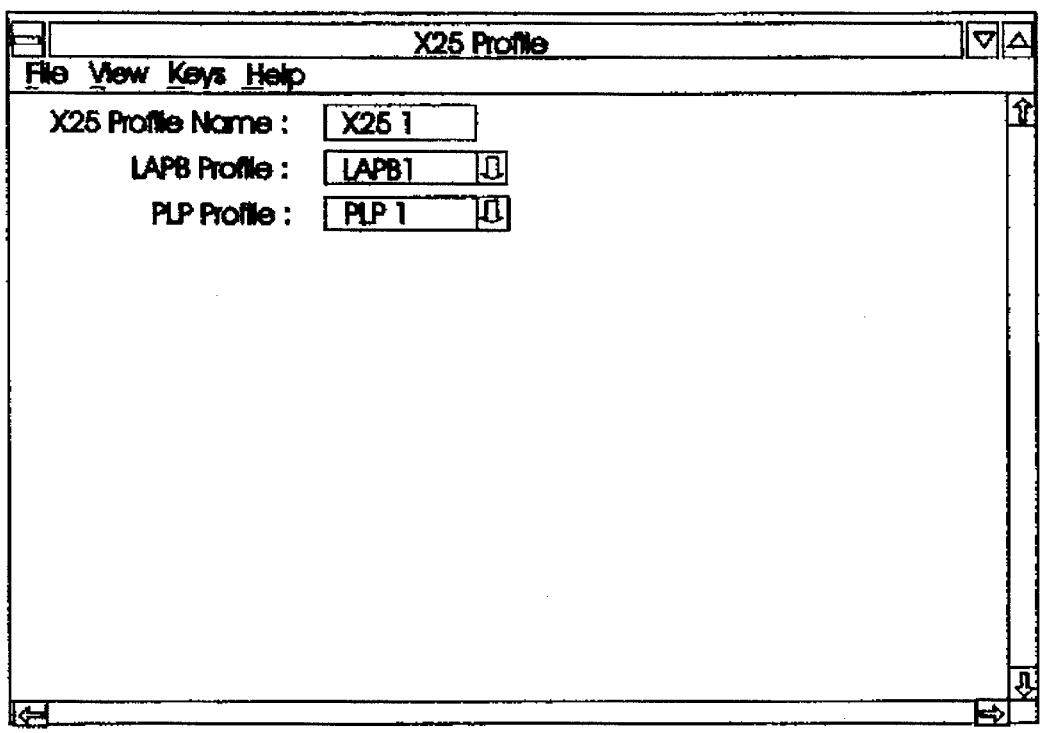
Figure 4G:
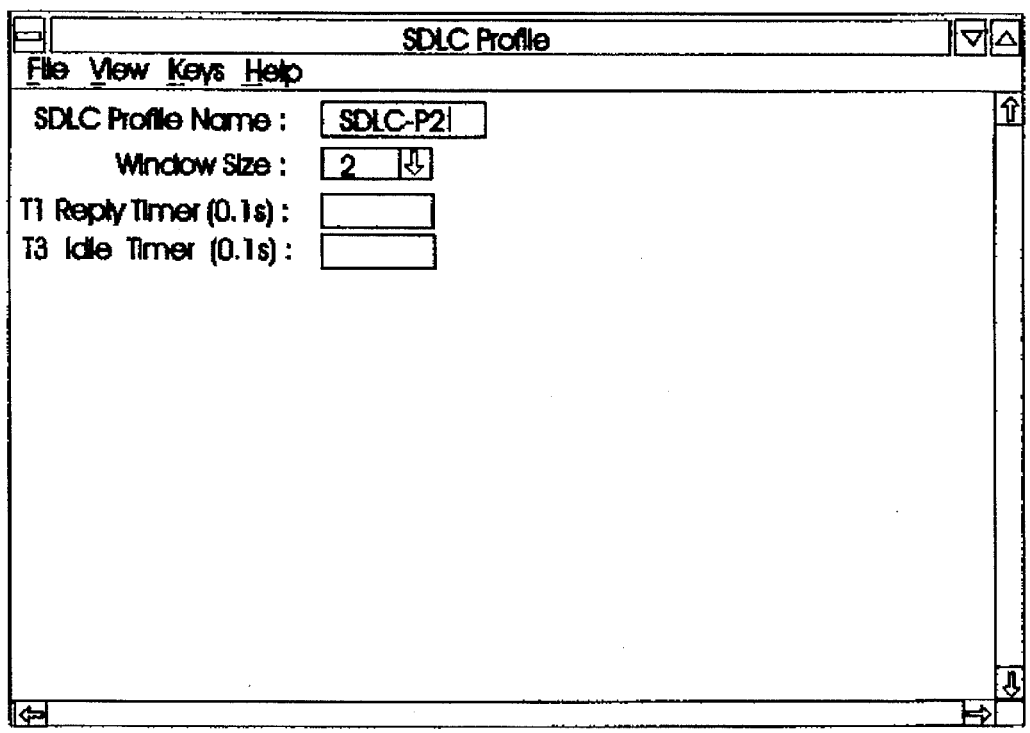
Figure 4H:
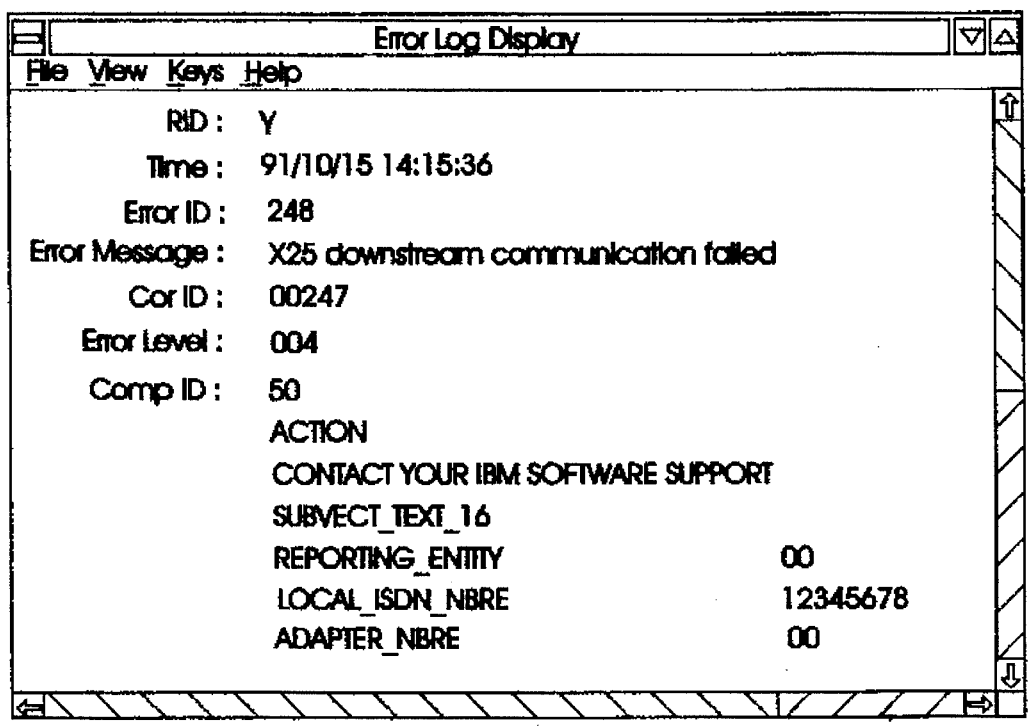

With respect to FIG. 3, there will be described now the Graphic Object Selector panel for managing the operation of an ISDN primary gateway system which is advantageously used in the method according to the present invention.

The Graphic Object Selector panel is composed of a set of 14 graphic objects which are displayed to the user. Some of the objects are associated to a corresponding file containing information which is needed. This allows a quick and efficient configuration and control of the machine, even by a user or an operator without high qualification in the telecommunication environment. As will appear below, the organization of the functional characteristic features of the machine takes advantage of the different relationships existing between the internal parts of the machine so that an easy configuration and control of the latter is made possible. In addition the user interface becomes completely independent of the teleprocessing routines.

Generally speaking, the method according to the invention involves the steps of displaying on the GOS of objects in a colour-coded manner in order to facilitate control of the machine. In the preferred embodiment of the invention a green color is used when the configuration data corresponding to one displayed object has been successfully compiled within the machine. In that case, the data will become operational on the next starting of the ISDN gateway.

A graphic object is displayed in yellow when configuration data corresponding to that object requires compilation. A graphic object is displayed in grey when a physical entity within the machine corresponding to the object is not installed or when characterizing data relative to the object have been removed from the current configuration.

The different objects which are displayed on the Graphic Object Selector (GOS) panel are organized in three distinctive classes, each class corresponding to a specific range of functional routines operating in the machine.

Graphic Object Selector (GOS) panel includes a first OPERATION window 310 area which contains information corresponding to technical characteristics which are needed for operating the machine. Particularly, these include the profile files containing protocol parameters for the terminals which can be attached to the network, gateway files characterizing the network and the computer workstation forming the basis for the gateway, the technical data characterizing the different ISDN and X25 cards which are possibly plugged in the workstation, and the ISDN Subscriber directory listing the subscribers who are allowed access to the network.

The graphic objects corresponding to the profile files of OPERATION window 310 include LAPB PROFILE object 311, PLP PROFILE object 312, X25 PROFILE object 313 and SDLC PROFILE object 314. LAPB PROFILE object 311 comprises data characterizing the LAPB Link Access protocol, i.e. corresponding to data relative to the Layer 2 in the OSI model, which can be used by the X.25 terminals. Such protocols are well known to those skilled in the art. Those parameters particularly include the definition of the window size, i.e. the number of packets which the transmitter can send before waiting for an acknowledgement, the size of the frames which are transmitted, the values of timers which are involved in the LAPB procedures etc.

PLP PROFILE object 312 contains the Packet Level Protocol (PLP) parameters for X.25 terminals using these profiles, i.e. corresponding to data relative to the layer 3 of the OSI model, such as the packet size consisting in the number of bits comprised within a packet etc.

The parameters which are respectively associated with the LAPB PROFILE object 311 and the PLP PROFILE object 312 can be associated by means of an additional object, a so-called X.25 PROFILE object 313 containing the parameters characterizing the links which are used for the X.25

Data Terminating Equipment (DTE). When the operator performs an editing of one X.25 PROFILE object 313, the gateway automatically recalls the parameters contained in LAPB PROFILE object 311 and PLP PROFILE object 312 which are associated to that particular X.25 PROFILE object. This allows the different configuration parameters of the numerous different terminals which are likely to communicate via the ISDN gateway, to be stored with less memory space. Further, this allows an easy and effective manipulation of the numerous parameters so that the configuration of the system is made much easier for the user.

Finally, SDLC PROFILE object 314 contains the parameters characterizing the SDLC transmission and reception with the host computer 15 of FIG. 1 via the ISDN network and the IBM 7820 Terminal Adapter (TA) illustrated in the same figure.

It should be noticed that the manipulation of those objects described above, and other objects described below, is facilitated by the monitoring of a double-clicking mouse-selection operation from the user during the editing of an object resulting in the loading of default parameters in the corresponding files.

In addition to the above described PROFILE objects 311, 312, 313 and 314, the OPERATION window 310 comprises a set of seven objects which characterize the configuration of the personal computer which embodies the ISDN primary gateway.

A GATEWAY object 315 comprises the parameters which are specific to the gateway apparatus being used: they particularly define the ISDN number of the machine, the country where it is located, the type of the ISDN network which is used, the control mode of the security access which is involved etc. GATEWAY object 315 can be manipulated by the user by means of the two following operations: STOP_GATEWAY and START_GATEWAY which, respectively, cause the machine to be stopped or started as explained below.

The manipulation of the GATEWAY object 315 is achieved as follows: the machine monitors the selection of this object by the user. Selection results in a highlighting of the object on the display, and with the displaying, on a dedicated area on the display, of menu bars of the two actions START_GATEWAY and STOP_GATEWAY which are then allowed to the user. Then, the gateway performs an additional monitoring of either a further selection of the GATEWAY object 315 or the selection of one among the two actions STOP_GATEWAY or START_GATEWAY which are displayed within the Graphic Object Selector (GOS). If the latter monitoring detects that the user has performed a second selection of the GATEWAY object 315, then an editing routine is called which allows the user to edit the corresponding object and address the parameters therein included. In the case where the latter monitoring operation results in the detection of the selection of the OPERATION action, then the start (or conversely the stopping) of the gateway can be performed by the user by means of an appropriate selection on one menu bar.

Four additional objects 316–319 respectively correspond to the different ISDN adapter cards which can possibly be plugged within the computer 1 of the FIG. 1. These objects are associated with configuration data. Those four objects 316–319 can be manipulated by the user only by means of two distinctive operations, a first CREATE and a second DELETE operation. Similarly to the above, when the user selects one among the four objects 316–319, the gateway program performs the displaying of corresponding menu bars associated with the CREATE and DELETE operations which are authorized. Then, the program enters a monitoring process where it detects either a second selection of the same object which was already selected, in which case the latter can be edited, or the selection of one among the two authorized CREATE or DELETE operations.

When the operator clicks the CREATE menu bar which is displayed within the Graphic Object Selector (GOS), the object 316–319 which has been currently selected can be created and the appropriate parameters which correspond to the considered ISDN cards can be stored. The gateway then performs a change in the color of that object which turns to yellow. A further change in the color will occur after the compilation of the parameters of this object, and the latter will then turn to green if the compilation succeeds. When the operator clicks the DELETE menu bar which is displayed within the Graphic Object Selector (GOS), the object which has been currently selected can be, conversely, deleted, then resulting in the latter having its color turned to grey. This indicates to the operator that the corresponding ISDN card has been or will be removed from the computer before the occurrence of the next Initial Program Loading (IPL) procedures.

The ISDN primary gateway apparatus is also characterized by two additional UPSTREAM_X.25_CARD objects 320 and 321 which are each associated with a file containing parameters which define the 12 lines which can be used for the connection of the ISDN primary gateway to the two host computers. For a given line, those parameters particularly comprise the logical name of the line, the port number which is used for this line, the X.25 address of the upstream X25 DTE 21 which is connected to this line, the X25 profile of the SDLC profile which is involved, i.e. a pointer to one among the objects 313 and 314, etc.

OPERATION window 310 further comprises a ISDN SUBSCRIBER DIRECTORY object 322 which is associated to a file including the list of the ISDN subscribers which will be allowed by the gateway to access a given application running within one of the host computers 22, 23, 24 or 25. The parameters contained in the ISDN SUBSCRIBER DIRECTORY object 322 particularly comprised the ISDN number and the extension number Called Party Subaddress (CPS) used in the ISDN communication, the ISDN and X.25 addresses of the subscriber, its terminal type (either X.25 or SDLC), and the appropriate profile, i.e. a pointer to the appropriate PROFILE objects 313 or 314.

As mentioned above, the method for controlling the configuration of the ISDN gateway according to the present invention takes benefit of the different relationships existing between the different, numerous parameters which are involved during the customization and day-to-day operating procedures of a sophisticated apparatus such as a ISDN Primary gateway device. This first requires the use of only a limited amount of storage memory since the organization of the objects which is described takes advantage of the relationship between those parameters and thereby prevents redundancy. In addition to this, the configuration and operation of the sophisticated ISDN primary gateway apparatus is made much easier for the non-experienced operator.

OPERATION window 310 also comprises a BACKUP object 323 which has the shape of a diskette. The manipulation of this BACKUP object 323 provides save and restore functions for the configuration parameters which are associated with objects 311, 312, 313, 314, 316, 317, 318, 319, 320, 321 and 322. The implementation of such store and save functions is well known to those skilled in the art and will therefore not be described with further detail.

An additional COMPILE ERROR object 324 allows the display of the compilation errors or incidents which might have occurred during the initialization of the machine. The compilation process of all the files associated with the above objects provides a set of corresponding binary files which will be used by the teleprocessing and operating code and routines in the machine. During the compilation of the files containing the above described parameters associated with the objects contained in the GOS 310, tests are performed in order to detect incompatibility between the different files associated with their corresponding objects. For instance, the operator might have keyed the same ISDN number for two distinctive DTEs during the editing process of SUBSCRIBER DIRECTORY object 322. The compilation process of the files that are associated with corresponding graphic objects, which compilation is performed prior to the general operating of the machine, i.e. the teleprocessing functions, involves a series of test procedures whose purpose is the detection of such incompatibily in the data that a non-experienced operator might introduce. When an error in the compilation has been detected, this information is recorded and made available to the user by means of the graphic COMPILE ERROR object 324.

The Graphic Object Selector (GOS) also includes a second PROBLEM DETERMINATION window which comprises a set of six distinctive graphic objects, a so-called ERROR LOG object 331, a STATISTICS_LOG object 332, a PS/2_INTERFACE object 333, a ISDN_IB_MEMORY object 334, an ISDN_DTE object 335, and an X.25 LINE object 336.

ERROR LOG object 331 and STATISTICS_LOG object 332 are associated with files recording some events which are useful for statistical purposes and for the management of error incidents which might have occurred on the lines and which were reported by the ISDN primary gateway apparatus, e.g. the occurrence of a transmission incident which might occur on one among the 30 ISDN links, and generally speaking any hardware or protocol errors or failures which have been reported to the gateway. STATISTICS LOG object 332 allows the browsing of protocol statistics, ie the number of sessions which have been established between two determined instants etc. The two files which are respectively associated with ERROR LOG object 331 and STATISTICS object 332 are a EVENT LOG file and a ERROR LOG file which can be browsed by means of two successive clicking operations on the mouse which are operated by the operator.

PS/2_INTERFACE object 333 can be manipulated by means of the mouse and provides the initiating of a trace operation, i.e. the storage in memory, for analysis purpose, of the fifty-four first bytes of every frame of data which goes through each CIB interface card 221 of the FIG. 2. ISDN_IB_MEMORY object 334 can also be manipulated by means of the mouse controlling the machine and provides the dumping, i.e. the storage in memory of the contents of the memory located within each CIB card 221. This facilitates maintenance operations since the main computer can obtain an instantaneous state of the different RIC cards 220 and their associated CIB cards 221.

The two last objects of PROBLEM DETERMINATION window 330 allow the possibility to start trace operation on specific lines. To achieve this, assuming that the operator clicks object 236 relating to a X25 line for instance, a routine is called which requests that the operator select a specific line. Then, when the latter selection has been completed, the sub-gateway apparatus performs a trace, i.e. records in a determined file the data flow which is transmitted through this specific line. Similarly, when the operator clicks object 235 associated to the ISDN lines, a routine is called which requests that the operator enter a specific ISDN subscriber number, and then the corresponding data flow on the B or D channel is recorded. Therefore, it should be noticed that, in addition to the advantage already mentioned above, i.e. the possibility exists of obtaining in one unique file an instantaneous state of the numerous cards which are plugged within the machine, the possibility of tracing a specific X25 or ISDN line to coordinate the numerous cards and subparts of the sophisticated ISDN gateway. Such features allow easy maintenance of the whole system and also provide the possibility to embody a sophisticated telecommunication product such as a ISDN primary gateway apparatus with a general purpose computer having appropriate multiple cards.

Finally, the Graphic Object Selector (GOS) comprises a third window which provides in real time the state of the different hardware parts of the machine and also the state of the different operational teleprocessing procedures which are currently performed. In the preferred embodiment of the invention, the third window is called GATEWAY_STATUS window 350. This third window comprises a first indicator, comprising an object 351 whose purpose is to inform the operator of the status of the ISDN primary gateway apparatus as being either STOPPED, or STARTING, or RUNNING, or STOPPING. A STOPPED indication informs the operator that no data are being passed through the gateway, while a RUNNING indicating reveals, on the contrary, that the gateway receives and transmits data. If object 351 indicates a STARTING message, then the operator is made aware that the machine has entered in an initialization procedure prior to the performing of any teleprocessing operations. When the object 351 indicates a STOPPING message, the operator is made aware that the machine has initiated a end-of-session procedure.

An additional object 352 indicates the status for each RIC communication adapter card 220. For this purpose, and to facilitate the operating of the machine, a color code is used for the definition of each status. In the preferred embodiment of the invention, a green color characterizes one card which is ready for transmitting and receiving data. A grey colour is used to inform the operator that the corresponding RIC adapter card is not configured or is not present in the slot, while a red color is representative of the occurrence of a hardware failure. Similarly object 352 comprises two indicators, X1 and X2, which are representative of the state of the two X.25 upstream cards (211).

The third window of Graphic Object Selector (GOS) further comprises a graphic indicator 353 which indicates whether trace operations are currently being performed. As mentioned above, such trace operations are the result of a TRACE command which is selected in association with one among the graphic objects 333, 335 and 336.

A DUMP graphic object 354 is used for informing the operator that a dump operation has been requested by the manipulation of the object 334 and is currently being performed.

To improve the configuration and day-to-day operating procedures, particularly for non-experienced operators, the graphic objects which are associated with files containing parameters are provided with the following editing facilities. Indeed, the PROFILE graphics objects 311, 312, 313 and 314, the X.25 adapter card objects, 320 and 321, the SUBSCRIBER_LIST object 322, the COMPILE_ERROR object 324, and the ERROR_LOG and STATISTICS_LOG files are provided with two distinctive modes of displaying the records according to the skill of the operator.

A CURRENT RECORD mode is first provided which causes the simple display of all the different records or parameters which are associated with a given graphic object being edited. This mode can also be advantageously used when updating the different records which are associated with the considered graphic object. FIGS. 4a to 4i are illustrative view of the use of this first mode.

However, for operators having a higher level of experience or skill in the manipulation of parameters and data relating to the telecommunication transmission, there is provided a second mode of editing, called a LIST_OF_RECORD mode which results in the simultaneous display of the records associated with the edited objects for all the items. FIG. 5 illustrates the LIST_OF_RECORD editing mode on the SUBSCRIBER DIRECTORY object 322, resulting in the display of a set of row comprising records arranged in column, one row being dedicated to one subscriber and one column of one given row containing one parameter of the considered subscriber.

FIG. 6 illustrates the chart giving the associations between the different actions and each graphic object being displayed in the Graphic Object Selector (GOS) and the different operations available. This chart shows the five following actions, i.e. EXIT, COMPILE, PASSWORD, DISPLAY STATUS, and HELP actions, the latter resulting in the display of a help facilities messages. EXIT is self-explanatory. The COMPILE action allows the checking of the validity of the data which were keyed in by the operator and stored in each object's file, and then compiled in order to generate the executable code. The PASSWORD action allows the management of password and other security facilities, and finally the DISPLAY STATUS initiates a specific routine causing the general program to display the internal status of the machine as will be described hereafter. The chart also indicates that some actions are available only for certain determined graphic objects: the RELOAD action, resulting in the gateway being reconfigured with the default parameters, and the already mentioned START and STOP actions are available for the GATEWAY object 315. Also the TRACE action is only available for the PS/2 INTERFACE object 333, ISDN DTE object 335 and X.25 LINE object 336. Three actions NEW, OPEN and DELETE are available for objects which are associated with a configuration file. However, the BACKUP object 323 is not manipulable by means of the NEW, OPEN or DELETE actions. ERROR_LOG object 331 and STATISTICS LOG object 332 can only be read or deleted by the operator, however, they can not be created since the associated files are generated by the operational teleprocessing routines running in the machine. The COMPILE ERROR object 324 is created during a compilation process of the whole configuration files which results in the detection of incompatibility between the data which are recorded in different files. The COMPILE ERROR object 324 will be erased after the next successful compilation.

An OPEN Action is available on the graphic objects which are associated with a file, i.e. objects 311–322, 324, 331 and 332. Double clicking by the operator on such an object (the two clickings being performed in less than 500 millisecond) results in the OPEN action being performed on this object. Consequently, the first RECORD edition mode is initiated which allows the operator to update the file being associated to the edited object. It should be noticed that in the preferred embodiment of the invention, the same result can be obtained by means of a different procedure. After a first click being performed on a given object, the operator can select the FILE action which is proposed in the menu bar being simultaneously displayed with the GOS. On the occurrence of the FILE action, the software causes a submenu to be displayed comprising the OPEN action which the operator can select. This submenu only comprises the appropriate actions which are authorized for the considered graphic object which was selected by the operator. This is achieved by using a correspondence table stored within the memory storage affected to the user interface program and which causes only the available actions to be displayed on the display and selectable by the operator.

The editing routine which is used in the method according to the present invention permits the operator to manipulate the files associated with some graphics objects by means of well known COPY, DELETE, DUPLICATE and CREATE operations, also operations for the manipulation of data, and at last the SAVE or EXIT, which are well known file management operations. In addition to these, the editing routine is provided with some SEARCH and SORT facility functions. The management of the different files, either the configuration files and the day-to-day operations files which are required for the general teleprocessing operations is based on a set of two different files. A first FILE DEFINITION file is associated with corresponding DATA files. The FILE DEFINITION file comprises a template characterizing all the different fields which are used for a considered file, particularly the name of the field, the type (numeric data or alphanumeric data), the range of possible values, the relationships between the different values or parameters between the different fields etc. For instance, the graphic object 320 is associated with a file having template comprising a CLOCK field may have two states: either EXTERNAL if the clock is externally provided or, on the contrary INTERNAL in the case where the clock is internally generated. Assuming that the clock is externally provided, the value of the speed which will be used will have to be comprises within a predetermined ranges of values which is stored in the FILE DEFINITION file. Similarly, in the case of an INTERNAL clock generated in the machine, the value of the speed will have to be chosen among a list of values which is also stored in the FILE DEFINITION file.

With respect to the FIG. 4a, the SUBSCRIBER DIRECTORY file will have a FILE DEFINITION file comprising the definition of a template consisting of a first field named TIME STAMP, a second field entitled ISDN NUMBER, a third field called ISDN CPS etc. The FILE DEFINITION file also comprises the test procedures and routines which ensure the integrity of data and which will prevent the operator from keying erroneous data. The FILE DEFINITION file is used by the user interface program when the operator wishes to create a new file corresponding to a given object, in our case the SUBSCRIBER DIRECTORY object 322. Then, when the operator keys the different parameters which will be used for updating of that file, the user interface program checks the data and stores them in the data file which is associated with the considered FILE DEFINITION file.

Therefore, the definition of the file and the template (which are contained in the FILE DEFINITION file) are clearly separated from the data which are necessary for the teleprocessing functions. This first results in a higher flexibility of the software program which can be maintained or modified more easily. In addition to this, since the FILE DEFINITION file comprises the test routines for the checking of the data, when the operator is entering data within the system, a first checking of that data can be immediately performed independently of the further checking operation which will occur during the above mention compilation process. Therefore the configuration and the use of the telecommunication equipment is made much easier, even for a non-experienced operator who can immediately be informed of the erroneous data he might have entered in the machine.

Figure 7B:
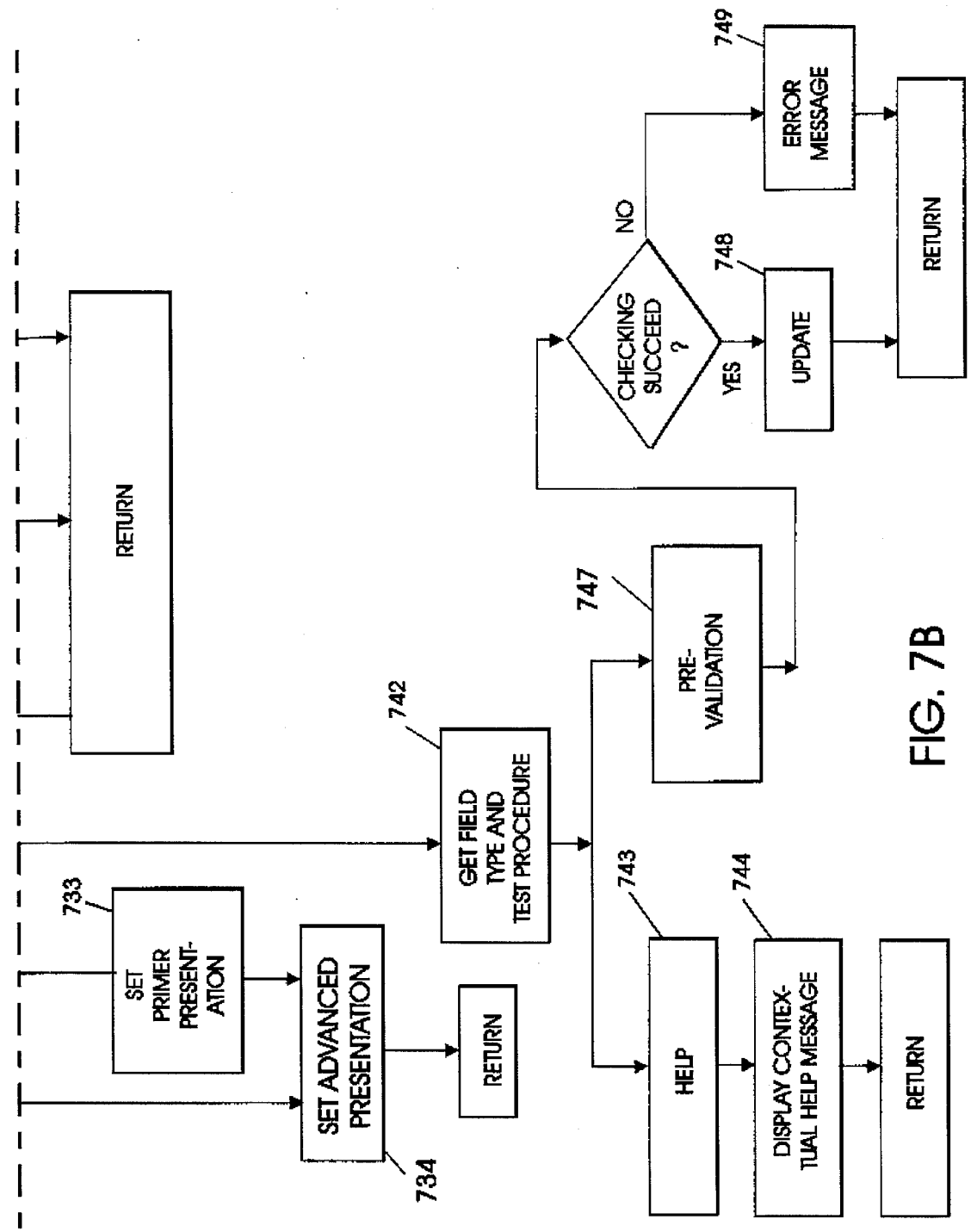
FIG. 7 illustrates the flow chart of the editing routine of the different graphic objects comprised in the Graphic Object Selector.

With respect to FIG. 7, there is shown a flow chart illustrating the different technical steps which are involved by the user interface method according to the present invention when the operator manipulates a graphic object which is associated with a file. On the selection of a given graphic object, also with the selection of the OPEN action, the user interface routines look in the FILE DEFINITION file and the DATA FILE which correspond to the considered object, step 710. Then, step 720, the user interface program displays the contents of the different fields and records of the object in the default mode of presentation. Then, the user interface program monitors a further request from the operator which can be either a request for VIEW, or data modifications, or still the other actions which were already mentioned above.

Assuming that the user has requested a VIEW action, step 730, then the user interface program causes a window to be displayed in which a selection for either the RECORD presentation mode or the LIST presentation mode is proposed to the user, step 732. As mentioned above, if the user requests that the user interface program uses a RECORD presentation mode, the latter program will display the different records of the considered objects as illustrated in FIG. 4a to 4i, step 733. In the reverse case, the user interface program will display the contents of numerous items associated with the considered objects arranged in a set of rows and columns such as illustrated in FIG. 5, step 734. In both cases, the process then proceeds to step 720 again.

If the operator has requested that a manipulation action be performed on the records, either a COPY, DELETE, DUPLICATE or CREATE, those are performed in step 760 and the process proceeds to step 720 again.

In the case of a HELP request, step 750, the user interface program displays a help panel which comprises general information relating to the use of the edition functions. Then, the process returns to step 720.

If the operator has requested SEARCH or SORT operations, step 770, the user interface program displays an interactive dialog box which allows the user to define the parameters which will be used for the search or sort investigations. The process then returns to step 720.

In the case where the operator has requested that the data of the records be accessed, step 740, then the user interface program calls a routine which will read the contents of the FILE DEFINITION in order to extract all the data characterizing the record, also with the test procedures, which are associated to the record of the template being accessed, step 742. The test procedures assure that the data which are keyed by the operator are valid. Then, the user interface program monitors a further request for the operator. If the latter request a HELP action, step 743, then the user interface program displays a contextual help panel in order to give prompt or help message step 744, which is adapted to the considered record or field being accessed since the contents of the latter contextual help message has been extracted from the FILE DEFINITION file associated with the considered object. The process then returns to step 742. On a DATA ENTRY request, step 747, the user interface program will use the test procedures which were stored in the FILE DEFINITION file for checking the validity of the data which was entered by the operator. This checking particularly comprises the testing of the type of data, either numerical or alphanumerical, and in the former case the value to determine whether it is comprised in the appropriate range of values which are defined in the FILE DEFINITION file. If the test procedure succeeds, then the user interface program authorizes the updating of the contents of the DATA FILE associated with the considered object, step 748. In the reverse case, the user interface program provokes the displaying of an appropriate error message which is also extracted from the FILE DEFINITION file. Then, the process returns to step 720.

If the operator has requested a FILE action, step 780, the different management functions which are available for the considered object are displayed to the operator, who can then select and validate the appropriate one. The user interface program then stores the DATA FILE associated with the considered record and returns to the display of the Graphic Object Selector (GOS) panel.

Figure 8:
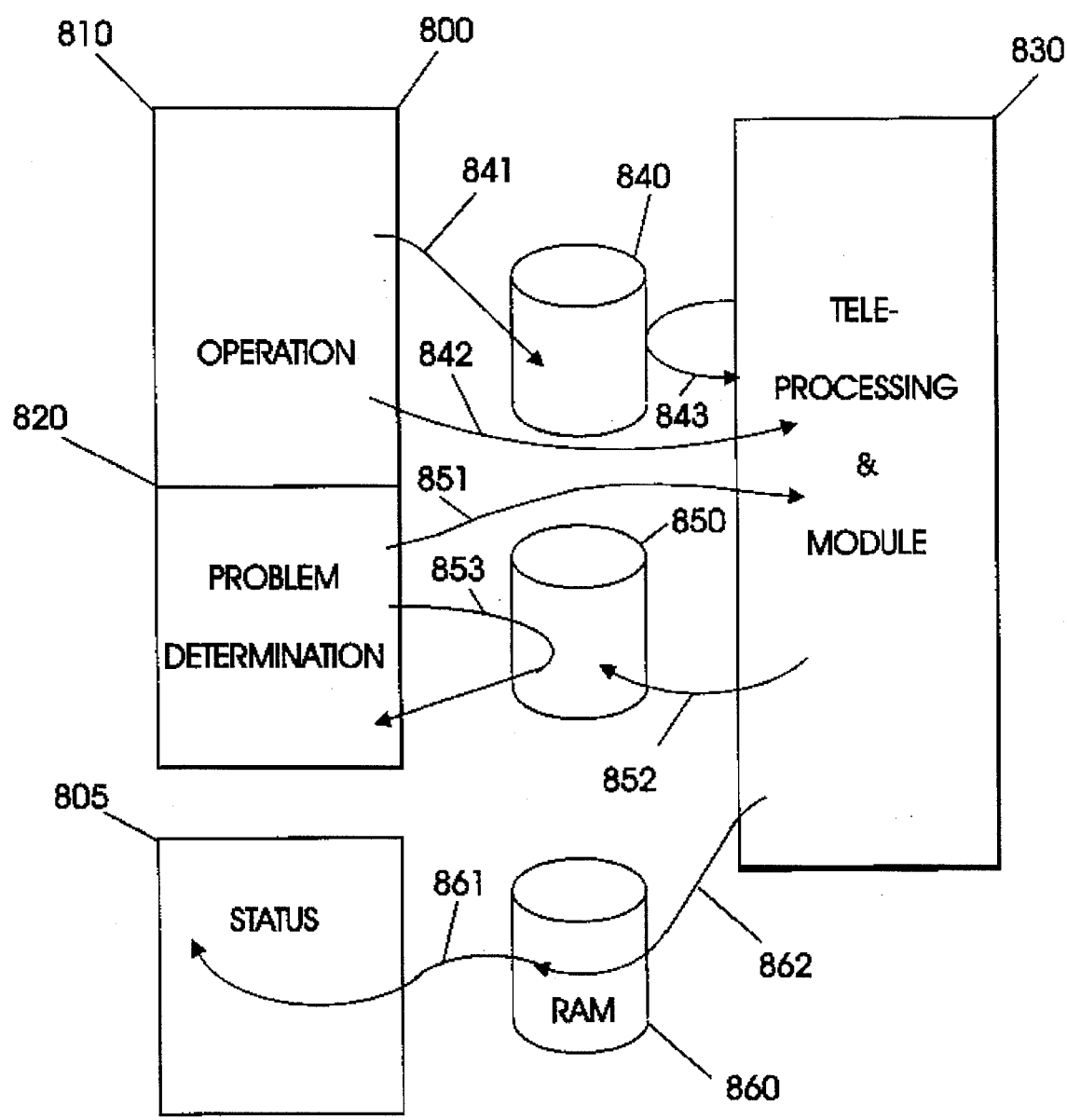
FIG. 8 illustrates the organization of the user interface module, the general teleprocessing module and the status displaying module, in such a way that each module can operate asynchronously.

With respect to FIG. 8, there is illustrated the organization of the different components of the user interface module and the teleprocessing modules. As shown in the figure, the relationship between the different modules is organized in such a way as to assure a wide asynchronousness between the different tasks which are performed by each module. This also provides a high independence between the user interface module, which must remain simple enough to be operated by less skilled operators, and the highly sophisticated teleprocessing routines which embody the operational functions of the ISDN primary gateway.

In the preferred embodiment of the invention, a first software module 800 comprises the set of user interface routines which was described above for the management of the different graphic objects which are displayed in the OPERATION and PROBLEM DETERMINATION windows of the Graphic Object Selector (GOS). Module 800 particularly comprises a OPERATION submodule 810 for achieving the management of the graphic objects of the OPERATION WINDOW 310 in FIG. 3 and a PROBLEM DETERMINATION submodule 820 for handling the management of the graphic objects of PROBLEM DETERMINATION window 330. In addition to module 800, there is provided a STATUS module 805 for handling the display and the management of the graphic objects of the STATUS window 350 of FIG. 3.

An additional module 830 comprises all the different operational routines which carry out the sophisticated teleprocessing functions of the ISDN primary gateway, e.g. the teleprocessing operation which are involved when a remote ISDN DTE requests the access to an application program running in a X.25 host computer.

The relationships and the communications between the different modules are as follows. User Interface module 800 exchanges data with teleprocessing module 830 via a first set of files 840. Files 840 contain the validated and compiled data corresponding to the graphic objects of the OPERATION window 310. As mentioned above, when the operator updates some objects of OPERATION window 310, the associated files are updated and compiled in order to generate executable data which are stored in file 840. This operation is represented in FIG. 8 by arrow 41. It should be noticed that, as described below, the compilation of the updating data is always preceded by a set of test and checking procedures to assure that no incompatible data can enter into the teleprocessing module, thereby assuring that even an operator having low-experience in teleprocessing field can operate the gateway.

Arrow 842 stands for a set of determined actions which the operator can use for calling some routines comprised in teleprocessing module 830.

For instance, if the operator requests a START action, the teleprocessing operational code initiates a routine which causes the contents of configuration files to be loaded in the memory storage available to the teleprocessing module 830, which is then followed by the initialization of the X.25 and ISDN adapter cards 220 and 211 of FIG. 2 as will be explained below in detail.

That operation is illustrated in FIG. 8 by means of arrow 843. In the case of a RELOAD command, the teleprocessing module 830 calls a routine (the action of which is also represented by arrow 843) which causes the contents of configuration files 840 to be loaded again in the operational memory storage which can be accessed by module 830. The clear separation existing between the user interface module 800 and the teleprocessing module 830 allows, in addition to the already mentioned increase in the facility of use, the possibility for the operator to update the configuration files 840 by manipulation of the appropriate graphic objects displayed on the Graphic Object Selector (GOS) without interfering with the teleprocessing process which is currently operating. This further prevents the operator from spoiling the current telecommunication process by mistake.

Arrow 851 represents the TRACE and DUMP actions which the operator can initiate by means of the manipulation of the appropriate graphic objects of PROBLEM DETERMINATION window 330. Those TRACE and DUMP actions entail a call of some routines in teleprocessing module 830 which will result in the append of a set of files 850, as illustrated arrows 852. Arrow 852 also corresponds to the append of the files 850 when the teleprocessing module 830 reports some incidents which will be reported to the operator via the ERROR LOG graphic object 331 of PROBLEM DETERMINATION window 330, or still when the teleprocessing module 830 reports some statistical data which will be made available to the operator by means of STATISTICS graphic object 332.

Similarly, the STATUS window 350 of Graphic Object Selector (GOS) is periodically refreshed by means of an exchange of data between STATUS module 805 and the teleprocessing module 830 via shared memory segment 860. In the preferred embodiment of the invention, every second, the teleprocessing module 830 updates the contents of the memory segment 860 located within the RAM storage of the PS/2, as illustrated by arrow 862. Its contents can thus be transferred into STATUS module 805, as represented by arrow 861, and be displayed to the operator in the window 350.

Figure 9:
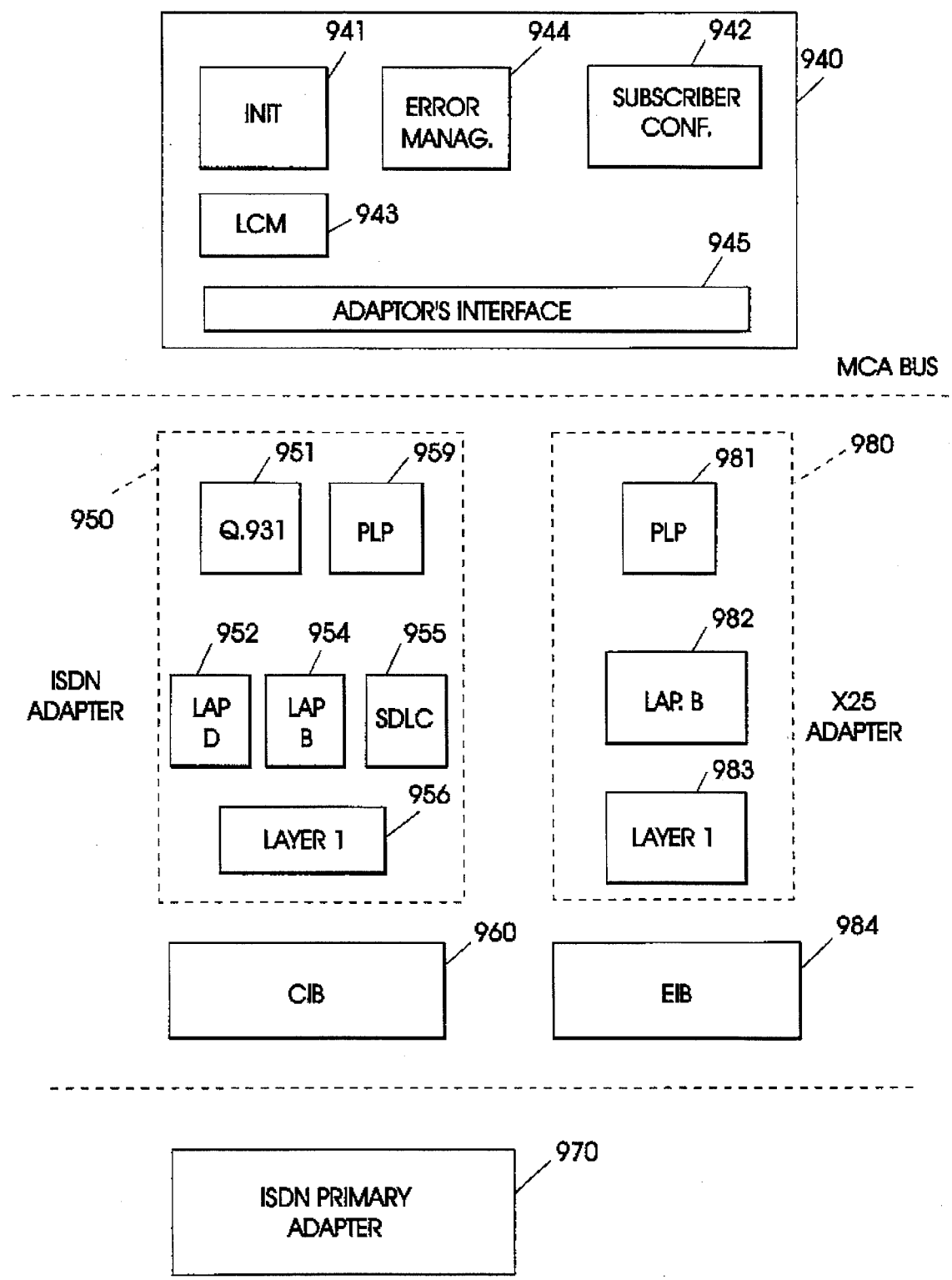
FIG. 9 illustrates the organization of the software components of the teleprocessing module which is distributed within the different storages of the machines, the adapter cards 211, 220 and 221 and the ISDN primary adapter 222.

FIG. 9 illustrates the organization of the different software submodules which are comprised in teleprocessing module 830 and their location in the different storages in the machine. Teleprocessing module 830 comprises a set of teleprocessing routines which cooperate together and which are distributed inside the PS/2 workstation, the ISDN RIC adapter cards 220 with their corresponding CIB card 221, the X.25 RIC adapters 211, and the ISDN primary adapter 222. A first module 940 comprises a set of routines which are located in the main storage of the workstation, and consisting of a INIT module 941 for the performing the initialization of the machine, as will be described hereinafter, a SUBSCRIBER CONFIGURATION module 942, a Logical Circuit Management (LCM) module 943, an ERROR management module 944 and a ADAPTERS INTERFACE module 945. SUBSCRIBER Configuration table 942 comprises the set of configuration tables of the gateway which corresponds to the compiled filed 840 of FIG. 8. LCM module 943 provides the management of the establishment and disconnection of the virtual circuits for the X.25 links through the gateway. In particular, when the gateway receives a request from a DTE for establishing a link, LCM module 943 looks in the configuration table 942 to check whether the requesting DTE is authorized to access the network. LCM module 943 also searches the parameters of the requesting DTE which were entered by the operator by means of user interface module 810 and the manipulation of the SUBSCRIBER DIRECTORY 322. Because of the logical relationship between object 322 and the profile graphics objects X.25 PROFILE object 313 and ISDN PROFILE object 314, the LCM module can automatically retrieve the characteristic parameters of the level 2 in the OSI model which will be used by module 950 located in the adapter cards.

An ERROR MANAGEMENT module 944 comprises the routines which provide the detection and the storage of the protocol errors, and hardware failures which might be detected by the machine and be reported to the operator via the user interface module 800.

An ADAPTER INTERFACE module 945 provides the routines for carrying out the interface between the Personal System/2 workstation and the different interface cards which are plugged in the later, via the Micro Channel Architecture (MCA) bus. Module 945 particularly manages the access to the different B channels, and to the X.25 link via the MCA bus. Module 945 also performs the transfer to the lower module 950 and 980 of the data and variables which are associated with the objects defining the protocol characteristics: X.25 protocol (LAPB and PLP) or SDLC as described hereinafter with respect to the FIG. 10.

A module 950 which is stored in the storage of the ISDN adapter card 220 (associated with its CIB card 221) comprises the different routines of the OSI layer 1, 2 and 3 which are necessary for the establishment and the management of 8 ISDN channels. Each card 220 manages up to 8 different B channels or 7 B channel plus one D channel. In that case, and as fully described in the above mentioned patent application, the D channel is managed by the first PORTMASTER card 220 which is defined during the initialization procedures of INIT module 941. The management of the D channel is performed by means of the Q.931 module 951 and LAPD module 952 which are stored in the PORTMASTER card mentioned above. The B channels are handled by the Packet Layer Protocol (PLP) module 959 and LAPB module 954 which achieve the different functions which correspond to the layer 2 and 3 of the OSI model. The definition of the functions which are involved in the Q.931, PLP, LAPB and LAPD module above are well know to those skilled in the art and are not part of the present invention. They will not be described with further detail. In order to handle the possibility of a DTE conforming to the SNA standard, a SDLC module 955 provides the layer 2 function which is specific to this standard. Layer 1 functions are distributed between a module 956 stored in the ISDN adapter card 220 and a CIB module 960 which is stored in CIB card 221. Therefore, each CIB card becomes capable of handling 8 B-channels which are multiplexed by means of CIB module 960 associated with module 970 located in the ISDN primary adapter 122.

Now considering the case of a X.25 adapter card 211. Each card has a module 980 which consists in functions of layer 1, 2 and 3 of the X.25 protocol. Similarly to above, the functions of the layer-1 are distributed in two distinctive modules, a first module 983 and a EIB module 984 stored inside the X.25 adapter card 211.

Each X.25 card is capable of handling up to 6 X.25 links. Similarly, to above, during the initialization procedures of the machine which are performed by INIT module 941, module 945 searches in the configuration tables for the data and parameters stored in file 840, which the operator has entered by the manipulation of the X.25 CARDS AND LINE object 320. Those data and parameters define the layer 2 and 3 characteristics of the line which are necessary for the management of the X.25 links.

More details about the technical operations which are performed and which allow the workstation and the numerous cards which are plugged therein to cooperate together in order to achieve the management of ISDN primary channel can be found in the above referenced patent application which is assigned to the same assignee.

Figure 10:
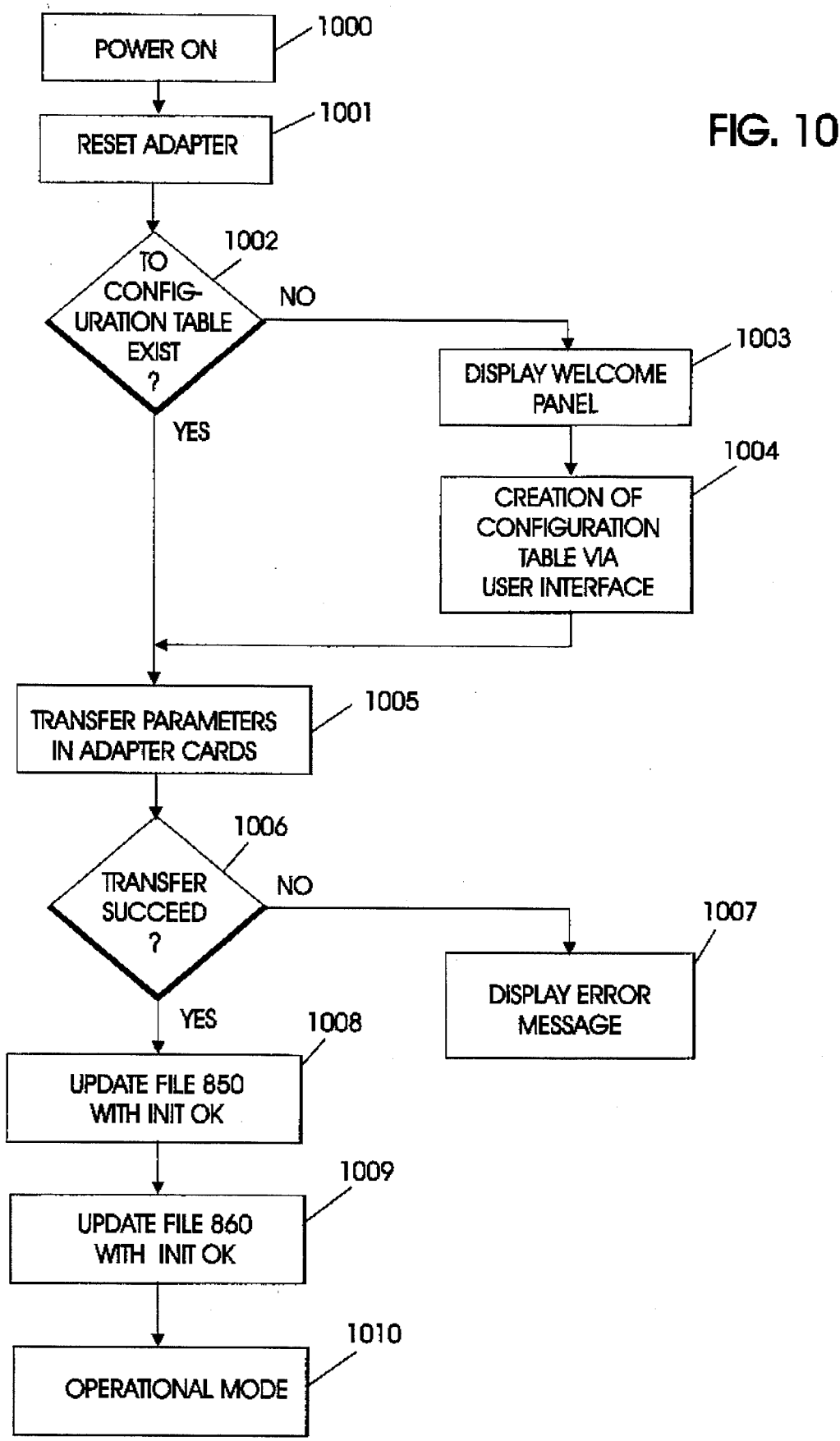
FIG. 10 illustrates the initialization process.

With respect to FIG. 10, there is illustrated the different technical steps which are involved during the initialization procedure of the ISDN primary gateway.

After the power-on of the machine, step 1000 or, after a reset, INIT module 941 performs a reset of all the PORT-MASTER adapters which are plugged into the Personal System/2 workstation, both X.25 and ISDN, step 1001. This causes each adapter card to perform in internal reset operation of all its internal components, particularly the reset of the memory storages and the initiating of the internal test procedures. Also, the daughter cards 221 and the ISDN primary adapter are reset. After this reset, INIT module 941 searches the parameters loaded in the configuration tables of module 942, the definition of the upstream X.25 links and the profiles which are associated therewith, step 1002. If the latter parameters are lacking in the files 840, then INIT module 741 causes a welcome panel to be displayed to inform the operator that the user interface module 800 is available for entering the data, step 1003. The configuration tables can then be created, by means of the manipulation of the appropriate graphic objects, followed by the compilation process of the associated files according to the process described above, step 1004. The completion of the configuration table generation process can then be followed by a START GATEWAY command entered by the operator which will render active the teleprocessing modules 830 inside the machine.

However, in the case where the configuration tables were already existing and compiled in file 840, then graphic object 351 in STATUS window 350 is activated to inform the operator that the initialization of the gateway is in progress. In the preferred embodiment of the invention, the color of the graphic object 351 is turned to yellow.

Then, ADAPTER INTERFACE module 945 performs the loading of the appropriate teleprocessing modules in each of the adapter cards, X.25 or ISDN, step 1005. For instance, in the case of a X.25 card, module 945 transfers the layers 1, 2 and 3 complying with the X.25 protocol in this adapter as illustrated in FIG. 9. Therefore, the needed information which are contained in the files associated with X.25 LINE AND CARDS graphic object 320 are transferred from files 840 in the memory storage of the X.25 adapter cards, so that they become available for the PLP module 981, LAP_B module 982. Similarly, the data and parameters loaded in files 840 which are associated with the characteristics of PROFILE objects 311 and 314 are transferred by ADAPTER INTERFACE module 945 in the ISDN cards. The technical steps which are involved for the transferring of code between the different cards are not part of this invention and they will not be described with more detail. However, those can be found in the description of the above mentioned patent application whose description is herein incorporated by simple reference.

Then, in step 1006, a test is performed to check the success of the above data and parameter code transfers. In the case where one of the different transfers of the parameters in the adapter cards has failed, an error message is displayed to alert the operator, step 1007. In the reverse case, a INIT OK message is transferred from the INIT module 941 of module 830 in file 850, as represented by arrow 852, step 1008. Consequently, the user interface module 800 which has access to file 850, as represented by arrow 853, can log the success of the initialization procedures. Also, as illustrated by arrow 862, the memory segment 860 used for the display of the STATUS window 350 is updated to inform the operator at the next refresh of the STATUS display that the initialization procedures have succeeded, step 1009. Therefore, the operator having a low level of skill is immediately made aware of the success of the operation and can proceed further with the operation of the gateway, while a logging of all the events is still kept in the file associated with the ERROR LOG object 331 so as to keep a history of the events which might be useful for maintenance in case of possible problems.

Then the gateway proceeds to the operational mode in step 1010. To achieve this, all the X.25 computers must be operational and then, the gateway waits for the first request coming from a DTE or from an X.25 server.

When an ISDN terminal calls in, the gateway checks whether the considered terminal has been registered in the ISDN SUBSCRIBER DIRECTORY.

The request transmitted by the DTE is received through the D channel and is processed by LCM module 943 which performs a search operation in the configuration tables of Module 942 to check whether the requesting DTE is authorized to get access to the application. In the case where the requesting DTE is not registered in the file 840 accessed by module 942, the call requested is rejected. In the reverse case, the call request is transmitted to the X.25 application running in the upper host computer 25 for instance. In the configuration tables loaded in file 840, the teleprocessing routine searches the parameters which are associated to the considered requesting DTE, i.e. its type (X.25 or SDLC) and also its associated profile. If the DTE is of X.25 type, then the profile is characterized by the LAP_B and PLP parameters which the operator has entered in the machine by means of the manipulation of objects 311, 312. If the DTE is of the SDLC type, then the profile is characterized by the parameters loaded in the files associated to object 314. These profiles are dynamically allocated to the B channel which is affected to this terminal. Therefore, each of of the 30 B-channels has the possibility to receive specific profile parameters. Then the gateway waits for the acknowledgement from the host computer in order to establish the point to point communication between the host and the requesting DTE. From this instant, both application programs of the layer 4 to 7 of the OSI model which run in the requesting DTE and the host computer can exchange data, images etc.

We claim:

1. In a telecommunication apparatus having an operator interactive display panel (FIG. 3), selector means for identifying and selecting portions of the panel, a user interface module (800) for handling communications with an operator, a teleprocessing module (830) for handling telecommunication procedures involved in the operation of the apparatus and an editor, a method for configuring and operating the apparatus including the following steps:

establishing a first window (310) including a first plurality of graphic objects (311–324) on said interactive display panel, each of said graphic objects being related to selected ones of a first set of parameters which include, telecommunication protocols, the telecommunication network and hardware components utilized in the said telecommunication apparatus, establishing a first file (840) for storing the said first set of parameters, said user interface (800) and said teleprocessing module (830) having access to said first file for updating the first file via the editor and the said teleprocessing module (830) being able to read the said first file (840), establishing a second window (330) including a second plurality of graphic objects (331–336) on said interactive display panel, each of said graphic objects being related to selected ones of a second set of data and parameters related to problem determination procedures, establishing a second file (850) for storing the said second set of data and parameters, said user interface (800) and said teleprocessing module (830) having access to said second file (850) for updating the said second file via the editor and the said user interface (800) being able to read the said second file (850), establishing a third window (350) on the interactive display panel including a third plurality of graphic objects (351–353), each of said graphic objects being related to selected information defining states of the telecommunications apparatus, and, establishing a third file (860) for storing said information defining states of the telecommunications apparatus, said user interface (800) being able to read the third file (860) and said teleprocessing module (830) being able to update the third file (860) via the editor, whereby, the said user interface (800) and the teleprocessing module (830) can operate asynchronously.

2. Method according to claim 1 comprising the step of displaying each of said first, second and third sets of objects in a color-coded manner in order to facilitate the control of the machine by an operator.

3. Method according to claim 1 or 2 characterized in that said user interface module (800) is provided with a first editing routine based on a RECORD editing process, and a second edition routine which is based on a LIST OF RECORD editing process providing a view of the entire contents of the object.

4. A method according to claim 3 in which the said first plurality of graphic objects includes a subset related to LAPB, PLP X.25 and SDLC protocol parameters.

5. A method according to claim 3 in which the said first plurality of graphic objects includes a graphic object (315) related to parameters of hardware components in the said telecommunication apparatus, said parameters including the serial number of the apparatus, the country in which the apparatus is located and the control mode of the security access.

6. A method according to claim 3 in which the said first plurality of graphic objects includes at least one graphic object (322) related to parameters associated with the terminals authorized access to the said telecommunication apparatus.

7. A method according to claim 1 in which said second set of graphic objects includes a graphic object (331) related to error or failure incidents.

8. A method according to claim 1 in which said second set of graphic objects includes a graphic object (332) related to statistical data.

* * * * *